Sept. 17, 1929.  C. O. CAROTHERS  1,728,595
CLAY PIGEON TRAP
Filed Sept. 18, 1925   5 Sheets-Sheet 1
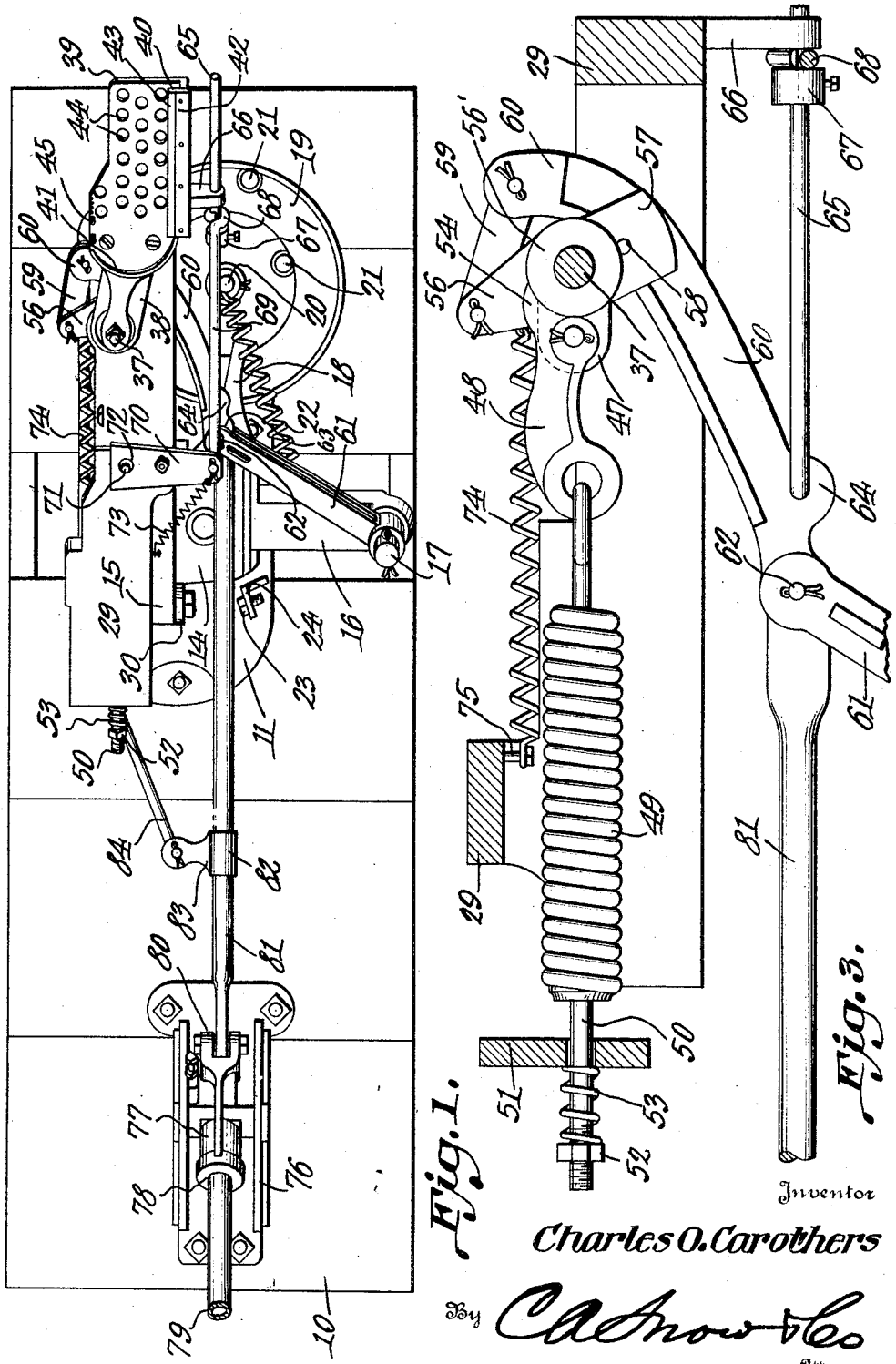
Inventor
Charles O. Carothers
By CA Snow & Co
Attorneys Sept. 17, 1929.  C. O. CAROTHERS  1,728,595
CLAY PIGEON TRAP
Filed Sept. 18, 1925   5 Sheets-Sheet 2
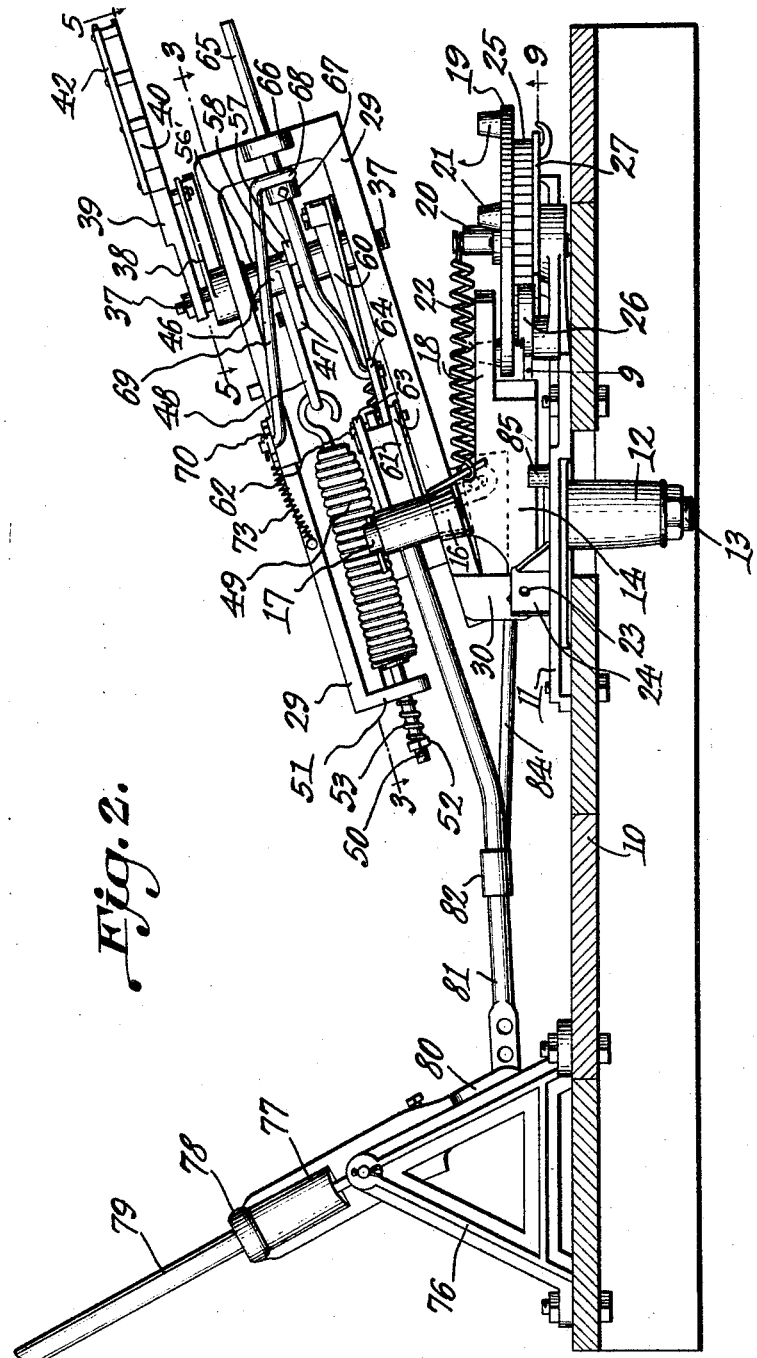
Inventor
Charles O. Carothers
By C.A.Snow&Co
Attorneys

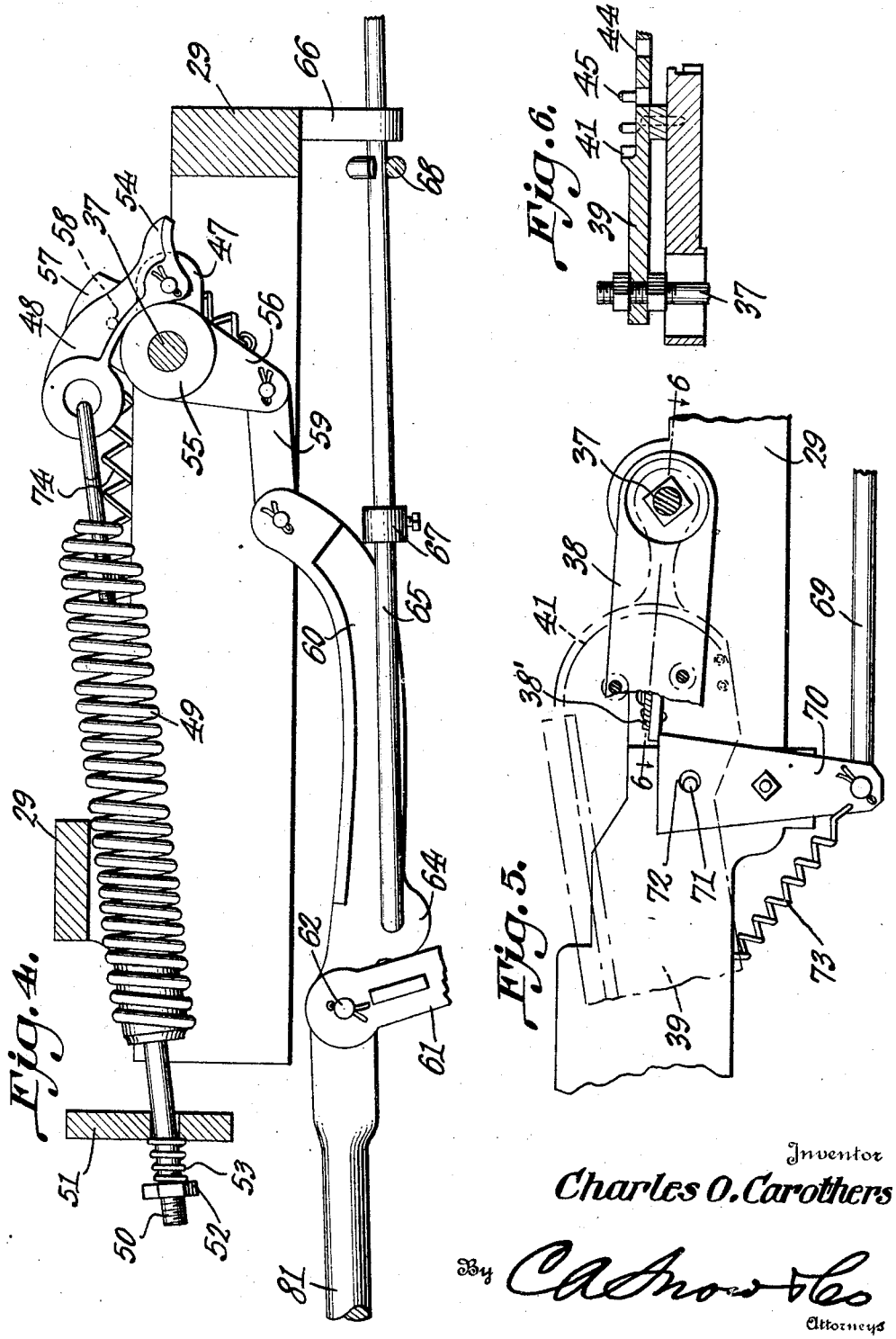

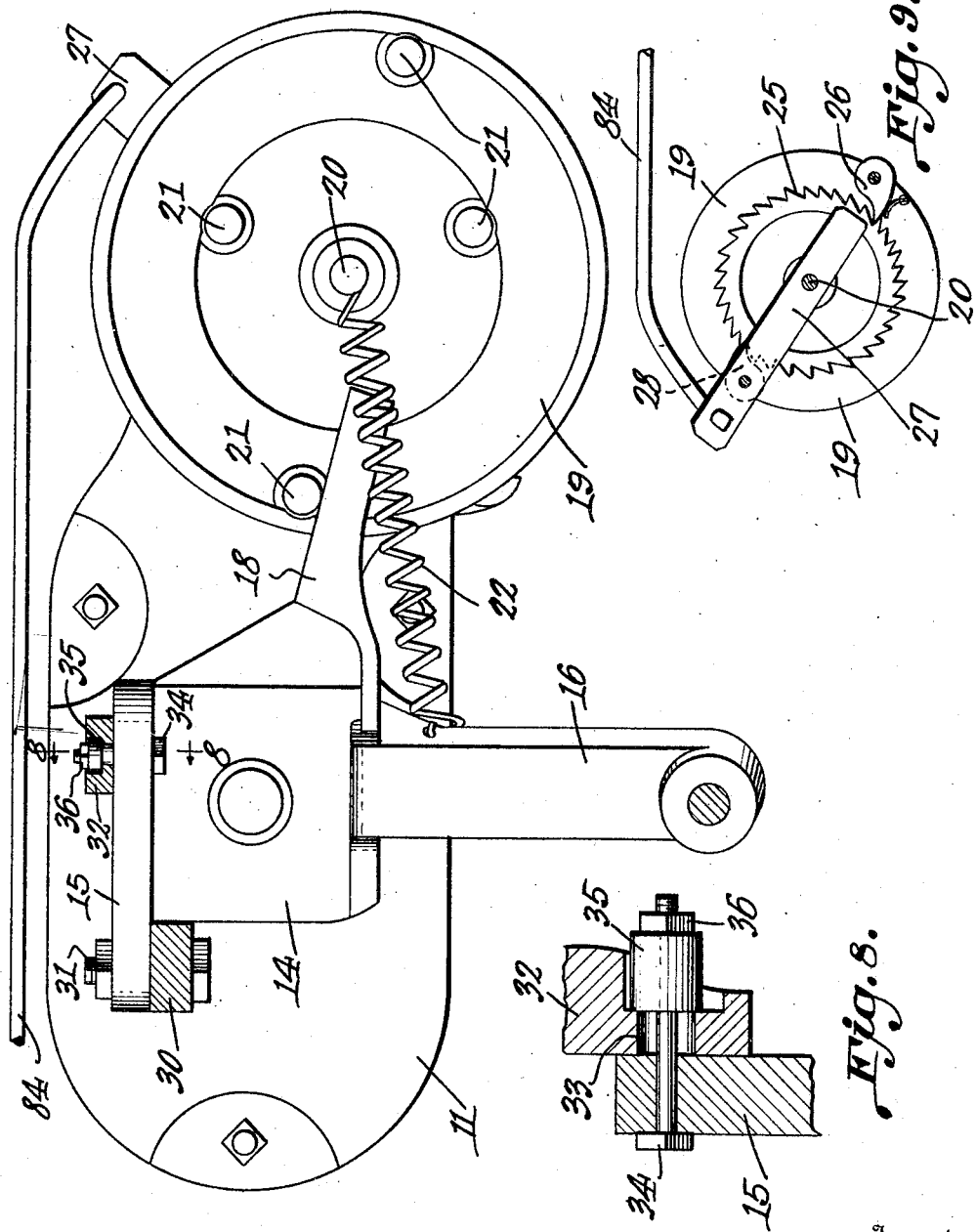

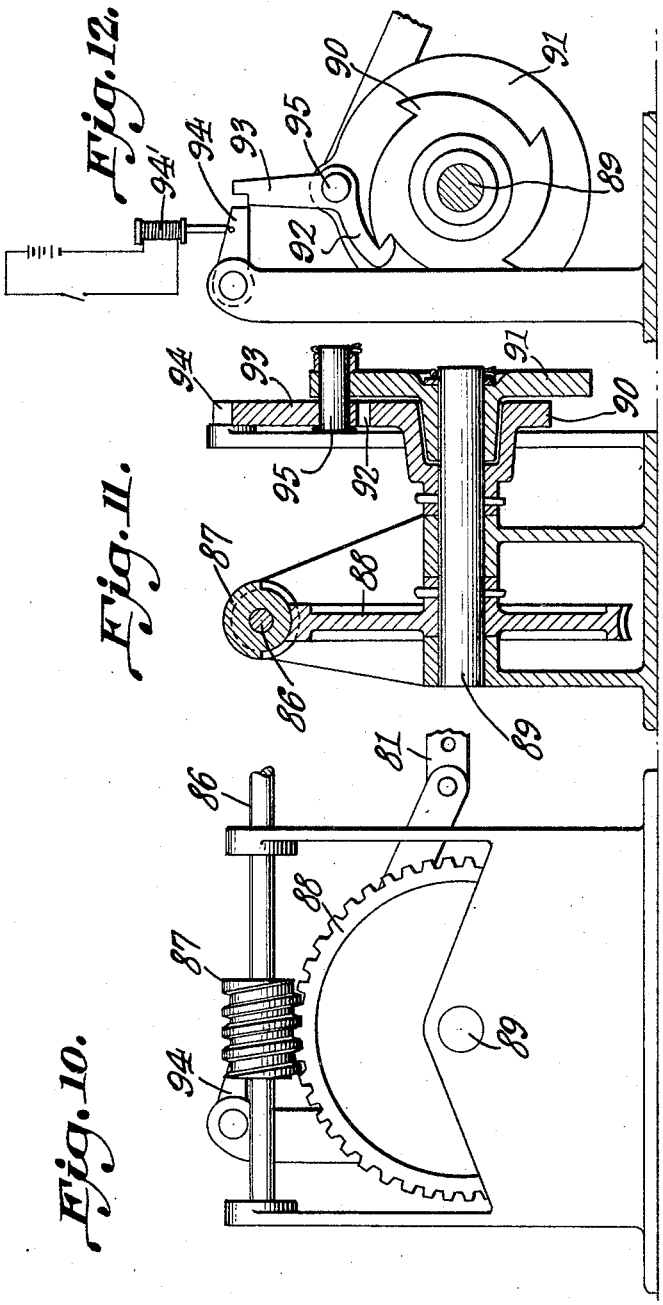

Patented Sept. 17, 1929

1,728,595

UNITED STATES PATENT OFFICE

CHARLES O. CAROTHERS, OF KENTON, OHIO

CLAY-PIGEON TRAP

Application filed September 18, 1925. Serial No. 57,231.

This invention relates to mechanism for throwing clay pigeons such as used in trap shooting.

One of the objects of the invention is to provide mechanism whereby the flight of each target can be changed after each shot, the angle of flight, which is unknown to the marksman, being kept within a predetermined sector.

A further object is to provide a structure of this character which makes it unnecessary to depend on the trap boy to change the direction of flight.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a plan view of the clay pigeon trap constituting the present invention.

Figure 2 is a side elevation, the supporting platform being shown in section.

Figure 3 is a section on line 3—3 Figure 2.

Figure 4 is a view similar to Figure 3 but showing the parts in another position.

Figure 5 is a section on line 5—5 Figure 2.

Figure 6 is a section on line 6—6 Figure 5.

Figure 7 is a top plan view of the tripping disk and adjacent parts.

Figure 8 is a section on line 8—8 of Figure 7.

Figure 9 is a section on line 9—9 Figure 2 showing the tripping disk in bottom plan.

Figure 10 is a side view of a power mechanism that can be used for actuating the trap.

Figure 11 is a section through said mechanism.

Figure 12 is a sectional view showing the ratchet mechanism and its releasing trip.

Referring to the figures by characters of reference 10 designates a platform of any suitable construction on which is bolted or otherwise fastened an attaching plate 11 having a depending bearing sleeve 12. Journaled within this sleeve is a stud 13 extending downwardly from a base 14 mounted for substantially horizontal rotation. This base has an upstanding flange 15 at one side while an arm 16 is extended laterally from the other side. This arm has a pivot pin 17 extending upwardly therefrom. A shifting arm 18 is extended from the base at a point between the flange 15 and the arm 16 and overhangs a portion of a disk 19 mounted for rotation on a pin 20 which is extended upwardly from the attaching plate 11. Upstanding on this disk 19 are pins 21. These pins are located at different distances apart and, in the structure illustrated, two of the pins are located adjacent the periphery of the disk while the remaining two are arranged inwardly from the periphery. All of these pins are so situated that they come into contact with and shift the arm 18 during the rotation of the disk 19. Arm 18 is held normally pressed yieldingly against one of the pins while in one extreme position by a spring 22 one end of which is connected to the arm 16 while the other end is connected to the bearing pin 20. When arm 18 is at one extreme limit of its movement the frame 14 can bear against the head of a stop bolt 23 adjustably mounted in a bracket 24 mounted on the base plate.

The disk 19 is provided on its bottom face with a ratchet 25 concentric therewith. A spring pressed dog 26 is pivotally mounted on the attaching plate and normally engages the ratchet to hold it against retrograde movement. A strip 27 is pivotally mounted on the pin 20 below the ratchet 25 and carries a pawl 28 which is held normally in engagement with one of the teeth of the ratchet. Thus by oscillating strip 27 the ratchet 25 and the disk 19 will be given an intermittent rotation in one direction.

A frame 29 is arranged above the base 14 and has a depending ear 30 pivotally connected to the flange 15 is shown at 31. This frame is also provided with a depending ear 32 lapping the outer side of the flange 15 and provided with a slot 33. A bolt 34 is extended through flange 15 and through a collar 35 which bears upon the slotted portion of the ear. Thus when the bolt is tightened by means of a nut 36 or in any other suitable way, the collar 35 will be bound against the slotted portion of the ear 32 so as to hold the frame in any position to which it may be adjusted angularly about the pivot 31.

A shaft 37 is extended downwardly through and is journaled within the frame 29, this being at right angles to the longitudinal axis of the frame. To the upper end of the shaft is secured an arm 38 and fastened to this arm is one end portion of the carrier 39, said carrier being also attached to the upper end of the shaft 37 as shown. This carrier is in the form of a plate having a longitudinal flange 40 along one side merging, at its inner end, into a transverse arcuate flange 41. A channeled strip 42 containing a length of rubber or other suitable flexible material indicated generally at 43 is secured upon the flange 40, the rubber strip being adapted to overhang a portion of the carrier. This carrier is preferably formed with apertures shown at 44 and extending upwardly from the carrier adjacent one end of the arcuate flange 41 are pins 45 which can be provided with rubber sleeves. The overhanging strip 43 operates to hold a clay pigeon properly seated on the carrier prior to the throwing action of the machine.

Secured to the upper portion of the shaft 37 close to but under the top of the frame 29 is a sleeve 46 having an arm 47 extending therefrom. Pivotally mounted on this arm is a link 48 one end of which is connected by a strong coiled spring 49 to a threaded stem 50 which is slidable within an ear 51 depending from the rear portion of the top of the frame 29. An adjusting nut 52 is mounted on this stem and a spring 53 is also mounted on the stem and bears at one end on the nut and at its other end against the ear 51. This spring 53 constitutes a means for yielding initially when sleeve 46 is rotated in one direction after which the spring 49 is placed under tension. A finger 54 is extended from the link 48 and is adapted to bear against sleeve 46 when said sleeve is rotated in one direction past its dead center.

Another sleeve 55 is journaled on the shaft 37 below the sleeve 46 and has oppositely extending arms 56 and 57 connected to it. A pin 58 is extended upwardly from the arm 57 and a link 59 connects the arm 56 to one end of a curved link 60. These parts are normally positioned as shown in Figure 3.

An arm 61 is pivotally mounted on the pin 17 at one end and the other end of this arm has a pivot pin 62 extending therethrough, said end of the arm 61 being forked as shown at 63. The link 60 is mounted on the pivot pin 62 and has an ear 64 adjacent said pivot pin. In this ear is mounted the downturned end of a rod 65 mounted to slide within a guide ear 66 extending laterally from the frame 29. A collar 67 is adjustably mounted on the rod 65 and slidably engaging the rod between this collar and the ear 66 is an eye 68 located on one end of a shifting rod 69. The other end of this rod is pivotally connected to one end of a short lever 70 which is fulcrumed on and extends laterally from the frame 29 as shown in figure 5. The movement of this lever relative to the frame is limited by a pin 71 extending from the frame 29 into a large opening 72 formed in the lever. A spring 73 is connected to the frame 29 and to the other end of lever 70 and serves to hold said lever normally at one limit of its movement as shown in Figure 5.

A relatively light coiled spring 74 connects arm 56 of sleeve 55 to a portion of the frame 29 as shown at 75.

Mounted on the platform 10 at a suitable distance back of the attaching plate 11 is a frame 76 in which is fulcrumed a lever 77 having a socket 78 for the reception of a removable handle 79. The lower end of this lever is as shown at 80 and is pivotally connected to one end of a pull rod 81 the other end of which is mounted on the pivot pin 62 of arm 61. To the rod 81 is secured a sleeve 82 having a laterally extending ear 83 connected by a rod 84 to one end of the strip 27.

When it is desired to use the apparatus herein described the bolt 34 is loosened and the frame 29 is adjusted angularly about its pivot 31 until it has been brought to a desired inclination after which the bolt 34 is tightened and the device is ready for use. A clay pigeon is placed on the carrier 39 so as to rest against the arcuate flange 41 back of pins 45 and under the rubber strip 43. The attendant pulls on the handle 79 of lever 77 so as to cause said lever to pull through the rods 81 and 84. Thus the pawl 28 will start rotating the ratchet 25 and disk 19 and one of the upstanding pins 21 will thrust against arm 18 and cause the base 14 and all of the parts carried thereby to swing laterally against the action of the spring 22. During this movement of the rod 84 the rod 81 will pull on the arm 61 and the links 60 and 59 will pull upon the arm 56 of the sleeve 55 and cause spring 74 to be placed under increased tension. Thus arm 56 and the parts connected thereto will be moved through some-what more than 180°. During the first portion of the rotation of sleeve 55 the pin 58 will come against the arm 47 and cause said arm to swing around the shaft 37. At the same time said arm 47 will pull through the link 48 upon the spring 49 and elongate it. In other words the parts will be moved from the position shown in Figure 3 to the other extreme position shown in Figure 4. When the shaft 37 is thus rotated a corresponding rotation or swinging movement of the carrier 39 is set up and this carrier is swung back so that the arm or plate 38 to which the carrier is secured will be extended rearwardly and a tongue 38' carried thereby will snap into engagement with the spring controlled latch lever 70 as shown in Figure 5. Obviously during this movement the collar 67 on rod 65 will pull away from the eye 68 as shown in Figure 4 so that the latch lever 70 is free to engage the tongue 38'. The parts are now set with the frame 29 pointing in a direction determined by the position of the pin 21 engaging arm 18. By now swinging the lever 77 in the opposite direction the rod 81, arm 61, links 60 and 59 and collar 55 will be free to swing back to their normal positions under the action of the spring 74 and until the projection 54 comes against collar or sleeve 55 as shown in Figure 3. The carrier 39, however, remains in set position where it is held by the latch lever 70. During the return movement of lever 77 and before the projection 54 reaches the position shown in Figure 3, the rod 65, which is sliding within the ear 66, arrives at a position where collar 67 will strike and press against the eye 68. Thus rod 69 will be pulled and cause lever 70 to move out of engagement with tongue 38'. This promptly releases the carrier and as the spring 49 is under tension, the carrier, when released, will be swung at a high speed about its pivot. This will cause the target, which is in the form of a disk, to roll along the flange 40 on the carrier until it is delivered from the end of the carrier from which it will travel at a high speed upwardly at an angle determined by the angle of the frame to the ground. When the carrier arrives at its normal position the momentum will cause it to swing a short distance past the dead center. This movement will be cushioned, however, and the carrier returned to its normal position by the stop finger 54 which will cause the link 48 to swing or rotate with the sleeve and place the spring 49 under a slight tension so as to act as a cushion. As this spring contracts after receiving the force of the momentum, the carrier and other parts will be restored to normal position after which the operation herein described can be repeated. Each time lever 77 is swung toward the carrier the pawl 28 again engages and rotates with the ratchet 25 so as to cause disk 19 to revolve. This results in one of the pins coming against arm 18 and again swinging the frame and its supporting base so that said frame will be held at a different angle than formerly. The arrangement is such that it can never be determined in advance exactly at what angle the frame will be when the target is delivered from the carrier. Thus there is no cause for dispute such as often arises in clay shooting contests where the changing of the angle is left entirely to the person having charge of the trap.

As has heretofore been explained the swinging movement of the base in one direction is limited by the adjustable stop bolt 23. The movement of this base in the opposite direction can be limited by a stop lug 85 on the attaching plate and in the path of the base.

Instead of relying upon the manipulation of a lever for actuating the trap, motor operated mechanism can be employed as shown in Figures 10, 11 and 12. In this modified form there is provided a shaft 86 adapted to be driven by an electric motor the current to which can be controlled in any suitable manner. Secured to this shaft is a worm 87 meshing with a large worm gear 88 secured to a shaft 89. To this shaft is attached a ratchet wheel 90. A wheel 91 is loosely mounted on the shaft 89 and is provided with a dog 92 adapted to engage one of the teeth of the ratchet. This dog has an outstanding arm 93 and supported in the path of this arm is trip 94 adapted to be shifted electrically, as by means of a solenoid 94' which can be controlled by a remote switch. A wrist pin 95 extends from the wheel 91 and can be engaged by the rod 81 heretofore referred to. It will be apparent that when the motor is started motion will be transmitted therefrom to the worm 87 and the gear 88 to the shaft 89 and the ratchet wheel will be caused to engage the dog 92 and compel the wheel or disk 91 to rotate therewith. During this rotation of the wheel the rod 81 will be thrust forwardly and pulled backwardly as heretofore explained and on the completion of one revolution of the wheel the arm 93 of the dog will come against the trip 94 so as to cause the dog to become disengaged from the ratchet wheel. In this way more than rotation of the wheel at each operation is prevented.

With a motor driven mechanism of this type it is possible for the marksman to operate the switch at a point remote from the trap, thus doing away with the services of an attendant.

Importance is attached to the use of the pins 21 disposed at different distances apart because as the result of their action, the marksmen can never tell at what angle the clay pigeon will be projected. Some times the target will be discharged twice in succession at the same angle while at other times the angle will vary considerably at successive operations. Thus there is no chance of determining in advance the direction in which the target will be thrown.

The use of pins 21 for the purpose above described permits the employment of a very simple mechanism for controlling the flight of the target. The carrier does not require the use of any movable parts cooperating therewith to control the flight and the structure is generally simplified and rendered more efficient than heretofore.

What is claimed is:

A clay pigeon trap including a frame adjustably mounted, an actuating lever mounted for oscillation, a shaft journaled on the frame, a carrier movable therewith, an arm movable with the shaft, a coiled spring anchored at one end to the frame, a link connecting the spring to the arm, oppositely extending arms pivotally mounted on the shaft, an articulated connection between the lever and one of the pivoted arms to move said pivoted arms on the shaft when the lever is moved in one direction, a projection on one of the pivoted arms for engaging the arm of the link during such movement, thereby to pull through the link upon the spring and place the link astride the shaft, means for automatically holding the link in the position to which it is shifted, means operated by the lever for releasing the link and spring, and means on the link for cooperation with the shaft to hold the link substantially radially of the shaft to pull upon the spring and retard the rotation of the shaft during the return of the released link and shaft to normal position.

In testimony that I claim the foregoing as my own, I have hereto affixed my signature.

CHARLES O. CAROTHERS.